UNITED STATES PATENT OFFICE.

EDWARD GOODRICH ACHESON, OF STAMFORD TOWNSHIP, WELLAND COUNTY, ONTARIO, CANADA.

METHOD OF DISINTEGRATING AMORPHOUS BODIES.

No. 843,426.  Specification of Letters Patent.  Patented Feb. 5, 1907.

Application filed December 31, 1906. Serial No. 350,100.

*To all whom it may concern:*

Be it known that I, EDWARD G. ACHESON, a citizen of the United States, residing at Stamford township, in the county of Welland, Province of Ontario, Canada, have invented certain new and useful Improvements in Methods of Disintegrating Amorphous Bodies, of which the following is a specification.

My invention relates to a method of treating amorphous bodies, having for its general object the disintegration thereof into the finest possible particles or molecules, whereby said fine particles or molecules may be further treated or used in various ways and for many purposes.

My invention consists in the method, substantially as hereinafter set forth, whereby the results substantially as stated may be accomplished.

It is exceedingly desirable in many cases that non-fused mineral bodies elemental or compound in character and more particularly amorphous bodies or substances—for instance, like graphite, lampblack, precipitated alumina, siloxicon, and amorphous carbid of silicon—be disintegrated and deflocculated into the finest possible particles or molecules, whereby the particles or molecules may be maintained in this finely subdivided or disintegrated condition, so that, for instance, they will remain suspended in water and can be used in this connection with great advantages, as in lubrication and the like, whereby the deflocculated particles or molecules may be flocculated and otherwise treated and collected for use in various connections, as in the formation of molded and other articles.

I have discovered that certain non-fused mineral bodies, and more particularly amorphous bodies, when treated or subjected to the action of certain materials, as more particularly set forth hereinafter, can not only be disintegrated into exceedingly-fine particles or molecules, but they will remain in this condition without the usual tendency to coalesce or flocculate and while in this condition may be used for various purposes.

The deflocculated particles or molecules can be further treated, as herein set forth, so as to cause them to flocculate, and in this way the amorphous bodies may be separated from other bodies, as crystalline bodies, and can be used for various purposes.

The material used in treating the non-fused mineral bodies, especially the amorphous bodies, and which have this modifying effect thereon, may vary in different cases, and I have found that various material having the astringent tannic principle—such as is found in gallo-tannic acid, catechu, extract of straw, and other materials having like characteristics—have a modifying effect like those due to the effects of tannin on these bodies. The method of using these materials for the purposes intended may vary according to circumstances, and I will illustrate my invention by specific instances of its use.

Generally stated, the non-fused mineral body, particularly the amorphous body, is preferably used in a powdered form. The powdered amorphous body is moistened or wetted with a solution of the modifying material—such as gallo-tannic acid, catechu, or the like—and the mass is thoroughly worked, as by means of a mortar or pugging-mill or the like, and it is then subjected to the action of a bur-mill or other grinding-machine, wherein it is disintegrated. The material may then be dried and used in various ways, or as when an especially pure, fine, and uniform product is desired the material as it comes from the bur-mill or other grinding-machine is diluted with water or other liquid in a suitable vessel, and the fine disintegrated and flocculated particles or molecules of the body being treated are suspended in the liquid and may be caused to float into another vessel or tank, and this may be repeated one or more times. The fine disintegrated and deflocculated particles or molecules may be recovered from the liquid in various ways, preferably by adding to the liquid carrying the molecules a small amount of muriatic acid or alum, which will cause the deflocculated particles or molecules to flocculate and settle, whereupon the clear liquid, free from the molecules, may be decanted or siphoned off and the particles or molecules collected in the form of a very fine powder and washed, dried, or otherwise treated and used. I have successfully used this method thus generally stated in connection with various bodies, among which I may mention siloxicon, graphite, lampblack, alumina, and amorphous carbid of silicon.

As a specific instance siloxicon and amorphous carbid of silicon were mixed in about equal amounts, and without intention the mixture contained a small amount of carborundum or crystalline carbid of silicon, and this mixture was wetted with an aqueous solution of catechu, the amount of catechu added being about three per cent. of the amorphous material. The mass was thoroughly worked up and then submitted to a grinding operation for a considerable period. It was then diluted with water, and after standing a short time the upper portion of the water carrying in suspension the deflocculated particles or molecules was decanted into another vessel and more water added and the decantation repeated. The deflocculated particles or molecules suspended in the water were so fine that when some of the water carrying them was thrown on a fine filter-paper the particles or molecules passed through the paper with the water with apparent ease. To the water holding the deflocculated particles or molecules was added a solution of alum, the amount of alum being about three per cent. of the suspended molecules. The particles or molecules were seen at once to flocculate, and in a few minutes they had all settled to the bottom and the clear water was decanted. The flocculated particles or molecules were mixed with water and thrown onto a filter and the water passed through the filter clear, all the powder remaining on the filter-paper. On examination of the powder under a microscope it appeared to be perfectly amorphous. On microscopic examination of some of the fine sediment from which the deflocculated molecules has been decanted it was found largely composed of microscopic crystals. The amorphous body had been completely separated from the crystalline.

Siloxicon moistened with an aqueous solution of catechu and subjected to the action of a bur-mill was disintegrated into very fine particles or molecules, and then when water was added in a separating-tank the suspended particles were floated off and recovered and the deflocculated powder was found to be extremely fine and would remain suspended in the water a considerable time, and after being flocculated by the addition of a solution of alum or equivalent it settled and was recovered, dried, and used. It could again be deflocculated by rubbing with a little water and catechu. From the fine siloxicon powder or molecules were formed articles which when dried were sufficiently cohesive to be handled and on heating to a temperature of about 2,000° Fahrenheit were sufficiently hard to form crucibles, brick and clay, and was self-binding.

Graphite when treated in the manner substantially as above set forth was found to result in an extremely-fine disintegrated deflocculated particles and would remain suspended in water and was used for lubrication and other purposes. It could readily be flocculated by treatment as above set forth when desired. Alumina and clay similarly treated resulted in improved products, among other things being more plastic.

I have found that by treating various bodies in substantially the manner described they can be disintegrated or subdivided into the finest particles or molecules and then be used for many and various purposes with the improved results, and many of such bodies so treated can be molded into shape, and they may harden or self-bind in the forms in which they are fashioned.

In using the term "amorphous" bodies and the term "tannin" I use them in the broadest sense, intending to cover and embrace in my invention those materials which when treated substantially in the manner set forth with the materials substantially set forth produce results of the general character described.

What I claim is—

1. The method substantially as hereinbefore set forth of disintegrating and deflocculating amorphous bodies, which consists in mixing them with a solution having effects thereon like those due to tannin, grinding the mass, and separating the deflocculated particles.

2. The method substantially as hereinbefore set forth of disintegrating and deflocculating amorphous bodies, which consists in mixing them with a solution having effects thereon like those due to tannin, grinding the mass, and separating the deflocculated particles by decantation.

3. The method substantially as hereinbefore set forth of disintegrating and deflocculating amorphous bodies, which consists in mixing them with a solution having effects thereon like those due to tannin, grinding the mass, separating the deflocculated particles by decantation, and subjecting the suspended particles to a flocculating material.

4. The method substantially as hereinbefore set forth of disintegrating and deflocculating amorphous bodies, which consists in mixing them with a solution having effects thereon like those due to tannin, grinding the mass, separating the deflocculated particles by decantation, subjecting the suspended particles to a flocculating material, by adding a solution of alum.

5. The method substantially as hereinbefore set forth of disintegrating and deflocculating amorphous bodies, which consists in mixing them with a solution having effects thereon like those due to tannin, grinding the mass, separating the deflocculated particles, and drying and molding the same into articles.

6. The method substantially as hereinbefore set forth of disintegrating and deflocculating amorphous bodies, which consists in mixing them with a solution having effects thereon like those due to tannin, grinding the mass, separating the deflocculated particles, drying and molding the same into articles, and subjecting the articles to the action of heat.

In testimony whereof I affix my signature in presence of two witnesses.

EDWARD GOODRICH ACHESON.

Witnesses:
   H. B. BODINE,
   HENRY S. ELY.